US012307358B2

(12) United States Patent
Ryu et al.

(10) Patent No.: US 12,307,358 B2
(45) Date of Patent: *May 20, 2025

(54) NEURAL NETWORK ACCELERATOR

(71) Applicant: SAMSUNG ELECTRONICS CO., LTD., Suwon-si (KR)

(72) Inventors: Sungju Ryu, Busan (KR); Hyungjun Kim, Pohang-si (KR); Jae-Joon Kim, Pohang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/604,268

(22) Filed: Mar. 13, 2024

(65) Prior Publication Data
US 2024/0220786 A1 Jul. 4, 2024

Related U.S. Application Data

(63) Continuation of application No. 18/085,939, filed on Dec. 21, 2022, now Pat. No. 11,954,582, which is a
(Continued)

(30) Foreign Application Priority Data

Jun. 14, 2019 (KR) .................. 10-2019-0070884

(51) Int. Cl.
G06N 3/063 (2023.01)
G06F 7/485 (2006.01)
G06F 7/523 (2006.01)
(52) U.S. Cl.
CPC ............. G06N 3/063 (2013.01); G06F 7/485 (2013.01); G06F 7/523 (2013.01)

(58) Field of Classification Search
CPC ........ G06N 3/063; G06F 7/523; G06F 7/485; G06F 7/5443; G06F 7/53; G06F 5/01; G06F 2207/4824; Y02D 10/10
(Continued)

(56) References Cited

U.S. PATENT DOCUMENTS 5,138,574 A 8/1992 Aoki et al.
6,711,602 B1 3/2004 Bhandal et al.
(Continued)

FOREIGN PATENT DOCUMENTS

JP S59-194242 A 11/1984
JP S63-73472 A 4/1988
(Continued)

OTHER PUBLICATIONS

Sharma, Hardik, et al. "Bit fusion: Bit-level dynamically composable architecture for accelerating deep neural network." *2018 ACM/IEEE 45th Annual International Symposium on Computer Architecture (ISCA)*. IEEE, 764-775, 2018.
(Continued)

Primary Examiner — Tan V Mai
(74) Attorney, Agent, or Firm — NSIP Law

(57) ABSTRACT

Disclosed is a neural network accelerator including a first bit operator generating a first multiplication result by performing multiplication on first feature 5 bits of input feature data and first weight bits of weight data, a second bit operator generating a second multiplication result by performing multiplication on second feature bits of the input feature data and second weight bits of the weight data, an adder generating an addition result by performing addition based on the first multiplication result and the second multiplication result, a shifter shifting a number 10 of digits of the addition result depending on a shift value to generate a shifted
(Continued)

addition result and an accumulator generating output feature data based on the shifted addition result.

19 Claims, 8 Drawing Sheets

Related U.S. Application Data continuation of application No. 16/868,845, filed on May 7, 2020, now Pat. No. 11,562,218.

(58) Field of Classification Search
USPC .............................. 706/41; 708/524, 620–630
See application file for complete search history.

(56) References Cited

U.S. PATENT DOCUMENTS

| | | |
|---|---|---|
| 8,645,451 B2 | 2/2014 | Langhammer |
| 8,959,137 B1 | 2/2015 | Langhammer |
| 2020/0005131 A1 | 1/2020 | Nakahara et al. |
| 2021/0342668 A1 | 11/2021 | Malik et al. |

FOREIGN PATENT DOCUMENTS

| | | |
|---|---|---|
| JP | 2018-092377 A | 6/2018 |
| KR | 10-2003-0072860 A | 9/2003 |
| KR | 10-2006-0044102 A | 5/2006 |

OTHER PUBLICATIONS

Wayne Wolf, "Modern VLSI Design: IP-Based Design," 4th Edition retrieved from [https://www.oreilly.com/library/view/modern-slsi-design/9780137010066/ch06.html] on Jul. 13, 2022.

Rastegari, Mohammad, et al. "Xnor-net: Imagenet classification using binary convolutional neural networks." *European conference on computer vision*. Springer, Cham, 2016.pp. 525-542.

Ryu, Sungju, et al. "Bitblade: Area and energy-efficient precision-scalable neural network accelerator with bitwise summation." *Proceedings of the 56th Annual Design Automation Conference* IEEE. Jun. 2019.

NEURAL NETWORK ACCELERATOR

CROSS-REFERENCE TO RELATED APPLICATIONS

This application is a Continuation Application of U.S. patent application Ser. No. 18/085,939, filed on Dec. 21, 2022, which is a Continuation Application of U.S. Pat. No. 11,562,218, filed on May 7, 2020 and issued on Jan. 24, 2023, which claims priority benefit under 35 U.S.C. § 119 to Korean Patent Application No. 10-2019-0070884, filed on Jun. 14, 2019, in the Korean Intellectual Property Office, the disclosures of which are incorporated by reference herein in their entireties for all purposes.

BACKGROUND

Embodiments of the inventive concept described herein relate to a semiconductor device, and more particularly, relate to a precision scalable neural network accelerator.

A neural network accelerator refers to hardware that processes data by imitating the brain of a human. The neural network accelerator may process data based on vARlous neural network algorithms. To process data, the neural network accelerator may perform vast amounts of matrix multiplication. In this case, there is a need for a large amount of memory for storing data and a large amount of computation for processing data. To reduce the memory usage and the amount of computation, like a method of reducing the number of bits in data, research for reducing the precision of data is being progressed. When the precision of data decreases, the accuracy of neural network computation may be reduced instead of reducing memory usage and computation.

The accuracy required for neural network computation may vary depending on an application. To support vARlous applications, there is a need for the neural network accelerator capable of performing operations based on precision according to the required accuracy. However, when this precision scalable neural network accelerator is implemented, the hardware area may be increased, and the power consumed in operations may be increased.

SUMMARY

Embodiments of the inventive concept provide a precision scalable neural network accelerator that has a small hardware area and consumes less power for computation.

According to an exemplary embodiment, a neural network accelerator includes a first bit operator generating a first multiplication result by performing multiplication on first feature bits of input feature data and first weight bits of weight data, a second bit operator generating a second multiplication result by performing multiplication on second feature bits of the input feature data and second weight bits of the weight data, an adder generating an addition result by performing addition based on the first multiplication result and the second multiplication result, a shifter shifting a number of digits of the addition result depending on a shift value to generate a shifted addition result, and an accumulator generating output feature data based on the shifted addition result.

In an embodiment, the shift value may be determined based on a number of digits of the first feature bits in the input feature data and a number of digits of the first weight bits in the weight data or may be determined based on a number of digits of the second feature bits in the input feature data and a number of digits of the second weight bits in the weight data.

In an embodiment, the input feature data may be divided into the first feature bits and the second feature bits depending on a number of operating bits of each of the first bit operator and the second bit operator, and the weight data may be divided into the first weight bits and the second weight bits depending on the number of operating bits.

In an embodiment, a number of bits of the first feature bits may be identical to a number of bits of the first weight bits.

In an embodiment, the first bit operator may generate the first multiplication result based on one selected depending on a selection signal among an XNOR operation and an AND operation.

In an embodiment, the output feature data may be a multiplication result for the input feature data and the weight data.

According to an exemplary embodiment, a neural network accelerator includes a first processing circuit generating a first operation result based on first feature bits of input feature data and first weight bits of weight data, a second processing circuit generating a second operation result based on second feature bits of the input feature data and second weight bits of the weight data, a first shifter shifting a number of digits of the first operation result depending on a first shift value to generate a first shifted operation result, a second shifter shifting a number of digits of the second operation result depending on a second shift value different from the first shift value to generate a second shifted operation result, and an accumulator generate outputting feature data based on the first shifted operation result and the second shifted operation result.

In an embodiment, the first shift value may be determined based on a number of digits of the first feature bits in the input feature data and a number of digits of the first weight bits in the weight data, and the second shift value may be determined based on a number of digits of the second feature bits in the input feature data and a number of digits of the second weight bits in the weight data.

In an embodiment, the first processing circuit may generate the first operation result by adding a first multiplication result for the first feature bits and the first weight bits to a second multiplication result for third feature bits of the input feature data and third weight bits of the weight data.

In an embodiment, a number of digits of the first multiplication result determined based on a number of digits of the first feature bits in the input feature data and a number of digits of the first weight bits in the weight data may be identical to a number of digits of the second multiplication result determined based on a number of digits of the third feature bits in the input feature data and a number of digits of the third weight bits in the weight data.

In an embodiment, a number of bits of the first feature bits may be identical to a number of bits of the first weight bits.

In an embodiment, the output feature data may be a multiplication result for the input feature data and the weight data.

BRIEF DESCRIPTION OF THE FIGURES

The above and other objects and features of the inventive concept will become apparent by describing in detail exemplary embodiments thereof with reference to the accompanying drawings.

DETAILED DESCRIPTION

Hereinafter, embodiments of the inventive concept are described in detail with reference to the accompanying drawings. In the following description, specific details such as detailed components and structures are merely provided to assist the overall understanding of the embodiments of the inventive concept. Therefore, it should be apparent to those skilled in the art that vAR1ous changes and modifications of the embodiments described herein may be made without departing from the scope and spirit of the present inventive concept. In addition, descriptions of well-known functions and structures are omitted for clAR1ty and conciseness. The terms described below are terms defined in consideration of the functions in the inventive concept and are not limited to a specific function. The definitions of the terms should be determined based on the contents throughout the specification.

In the following drawings or in the detailed description, modules may be illustrated in a drawing or may be connected with any other components other than components in the detailed description. Modules or components may be connected directly or indirectly. Modules or components may be connected through communication or may be physically connected.

Unless defined differently, all terms used herein, which include technical terminologies or scientific terminologies, have the same meaning as that understood by a person skilled in the art to which the present inventive concept belongs. Terms defined in a generally used dictionary are to be interpreted to have meanings equal to the contextual meanings in a relevant technical field, and are not interpreted to have ideal or excessively formal meanings unless clearly defined in the specification.

Figure 1:
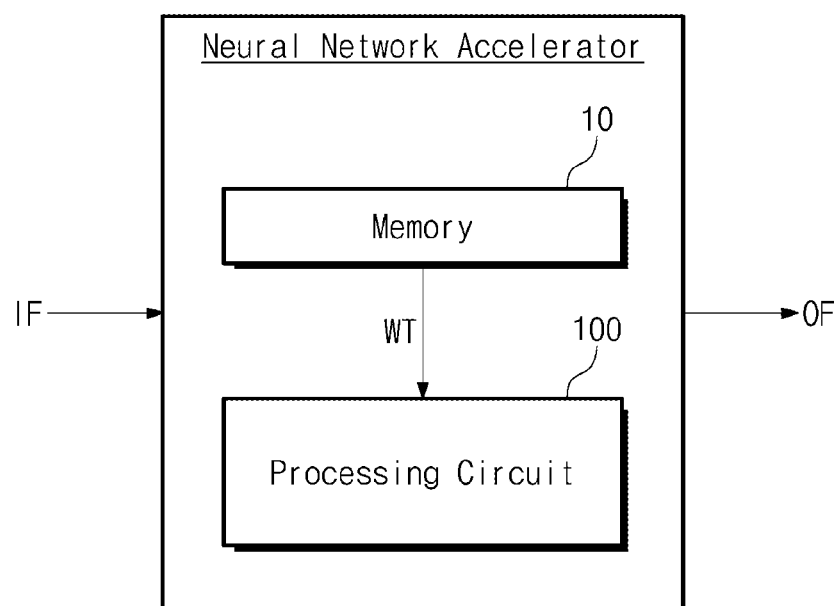
FIG. 1 illustrates a block diagram of a neural network accelerator according to an embodiment of the inventive concept.

FIG. 1 illustrates a block diagram of a neural network accelerator according to an embodiment of the inventive concept. A neural network accelerator 1000 may process input feature data IF based on the neural network to generate output feature data OF. For example, the neural network accelerator 1000 may process the input feature data IF based on convolutional neural network (CNN). However, the inventive concept is not limited thereto. For example, the neural network accelerator 1000 may use vAR1ous neural network algorithms.

Referring to FIG. 1, the neural network accelerator 1000 may include a memory 10 and a processing circuit 100. The memory 10 may store weight data WT. For example, the weight data WT may be kernel data. For example, the memory 10 may be implemented with a volatile memory such as DRAM, SRAM, or the like or a nonvolatile memory such as a flash memory, MRAM, or the like.

The processing circuit 100 may receive the weight data WT from the memory 10 and may perform calculations based on the weight data WT and the input feature data IF. The processing circuit 100 may generate the output feature data OF as the result of the calculations.

An example is illustrated in FIG. I as the memory 10 is included in the neural network accelerator 1000, but the inventive concept is not limited thereto. For example, the neural network accelerator 1000 may receive the weight data WT from an external memory.

According to embodiments of the inventive concept, the neural network accelerator 1000 may perform calculations based on data precision scalable depending on the required accuracy. In particular, even though the number of bits of the input feature data IF and the weight data WT vAR1es depending on the required accuracy, the neural network accelerator 1000 may perform calculations based on the input feature data IF and the weight data WT, which have vAR1ous numbers of bits. Accordingly, the neural network accelerator 1000 may perform efficient operations on applications requiring vAR1ous accuracies based on a neural network.

Figure 2:
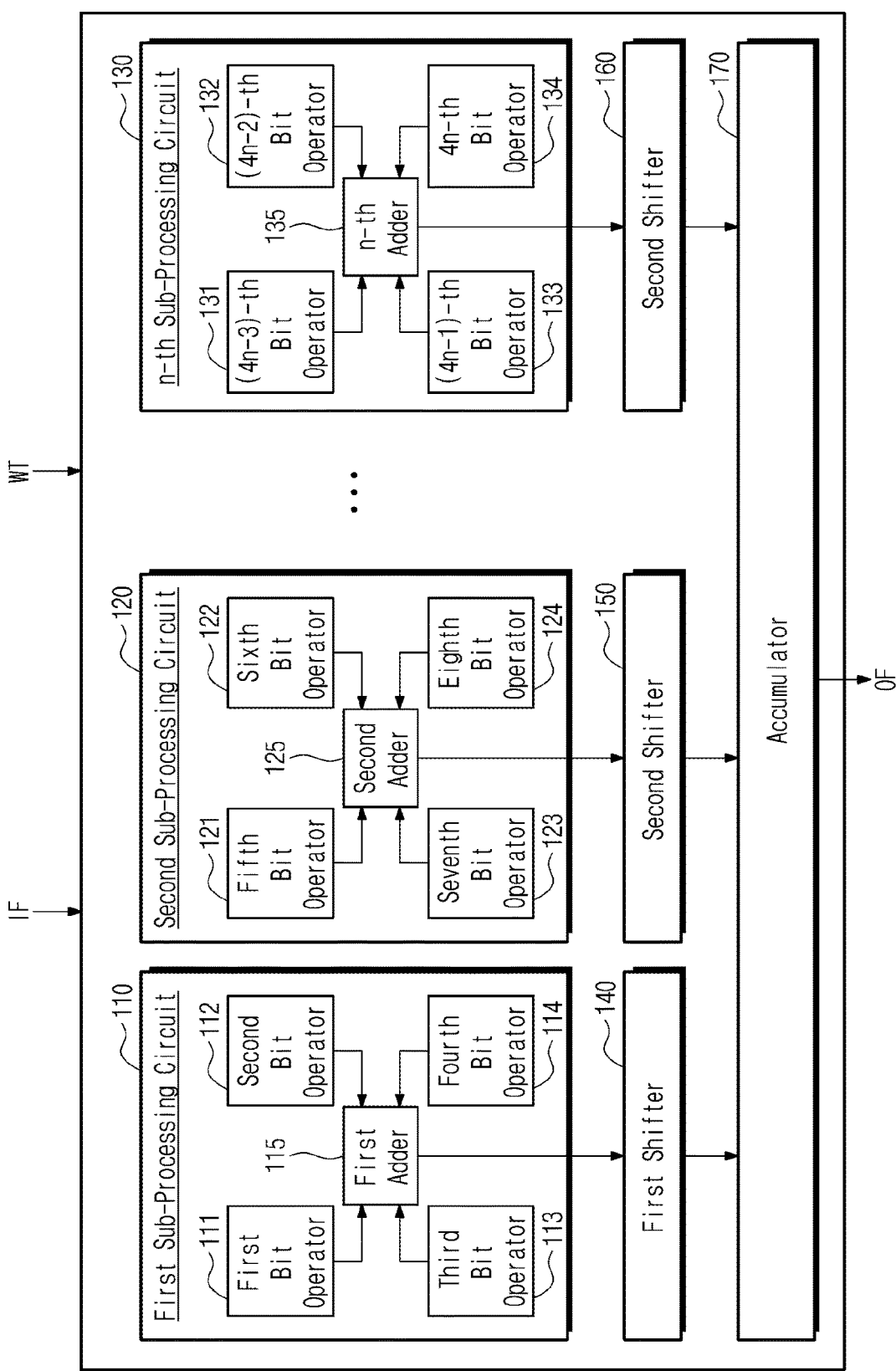
FIG. 2 illustrates an exemplary block diagram of the processing circuit of FIG. 1.

FIG. 2 illustrates an exemplary block diagram of the processing circuit of FIG. 1. Referring to FIG. 2, the processing circuit 100 may include first to n-th sub-processing circuits 110, 120, and 130, first ton-th shifters 140, 150, and 160, and an accumulator 170. The first sub-processing circuit 110 may include first to fourth bit operators 111, 112, 113, and 114 and a first adder 115. The second sub-processing circuit 120 may include fifth to eighth bit operators 121, 122, 123, and 124 and a second adder 125. Then-th sub-processing circuit 130 may include (4n−3)-th to 4n-th bit operators 131, 132, 133, and 134 and an n-th adder 135.

Each of the bit operators 111 to 114, 121 to 124, and 131 to 134 may multiply two pieces of input data. For example, some bits of the input feature data IF and some bits of the weight data WT may be provided to the first bit operator 111. In this case, the first bit operator 111 may perform a multiplication operation on some bits of the provided input feature data IF and some bits of the weight data WT. For example, each of the bit operators 111 to 114,121 to 124, and 131 to 134 may perform multiplication by 2 bits (i.e., the number of operating bits of the bit operator is 2 bits). However, the inventive concept is not limited thereto.

Each of the adders 115, 125, and 135 may receive operation results from the corresponding bit operators and may perform addition on the received operation results. For example, the first adder 115 may perform addition on operation results provided from the first to fourth bit operators 111 to 114.

Each of the shifters 140 to 160 may shift the number of digits of the addition result provided from the corresponding sub-processing circuit 110 to 130. In an exemplary embodiment, each of the shifters 140 to 160 may shift the number of digits of the addition result depending on a predetermined shift value or may shift the number of digits of the addition result depending on the shift value entered as a separate control signal. For example, the shifter may shift the number of digits of the addition result by adding 0-bits to the addition result depending on the shift value.

In an exemplary embodiment, the shifters 140 to 160 may shift the number of digits of the addition result depending on different shift values. For example, the first shifter 140 may shift the number of digits of the addition result by 4; the second shifter 150 may shift the number of digits of the addition result by 2. However, the present inventive concept is not limited thereto, and different shifters may shift the number of digits of the addition result depending on the same shift value.

The accumulator 170 may receive the shifted shift results from the shifters 140 to 160. The accumulator 170 may perform addition on the shifted addition results. Accordingly, the output feature data OF or a partial sum may be generated as the addition result. When the output feature data OF is generated as the addition result, the accumulator 170 may output the output feature data OF. When the partial sum is generated as an addition result, the accumulator 170 may accumulate the generated partial sums to generate the output feature data OF.

An embodiment is illustrated in FIG. 2 as the processing circuit 100 includes 'n' sub-processing circuits 110 to 130, but the inventive concept is not limited thereto. For example, the processing circuit 100 may include vAR1ous numbers of sub-processing circuits. In this case, the number of shifters corresponding to the number of sub-processing circuits may vary.

An embodiment is illustrated in FIG. 2 as a single sub-processing circuit includes four bit operators and a single adder, but the present inventive concept is not limited thereto. For example, a single sub-processing circuit may include vAR1ous numbers of bit operators and vAR1ous numbers of adders.

Hereinafter, the operation of the processing circuit 100 of FIG. 2 will be described m detail with reference to FIGS. 3A to 5. For convenience of description, it is assumed that the neural network accelerator 1000 calculates the output feature data OF based on 4-bit input feature data IF and 4-bit weight data WT. However, the inventive concept is not limited thereto. For example, the neural network accelerator 1000 may support operations for the input feature data IF and the weight data WT, which have vAR1ous bit numbers. That is, the neural network accelerator 1000 may support operations on data having vAR1ous precisions. In addition, for convenience of description, it is assumed that each of the bit operators performs multiplication by 2 bits. That is, it is assumed that the number of operating bits of the bit operator is 2-bit, but the present inventive concept is not limited thereto.

Figure 3A:
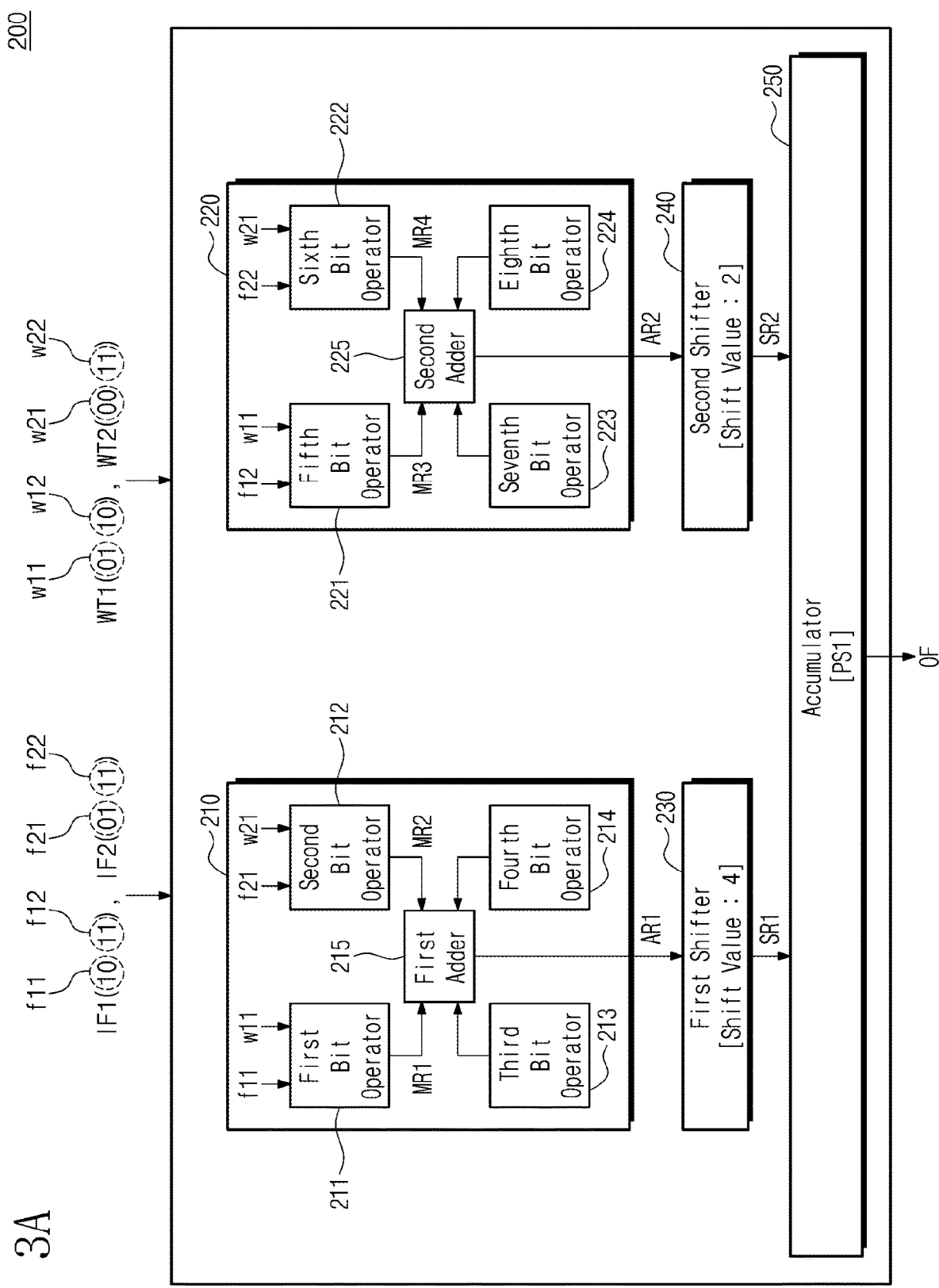
FIGS. 3A and 3B illustrate a single example in which the processing circuit of FIG. 2 generates output feature data based on input feature data and weight data.
Figure 3B:
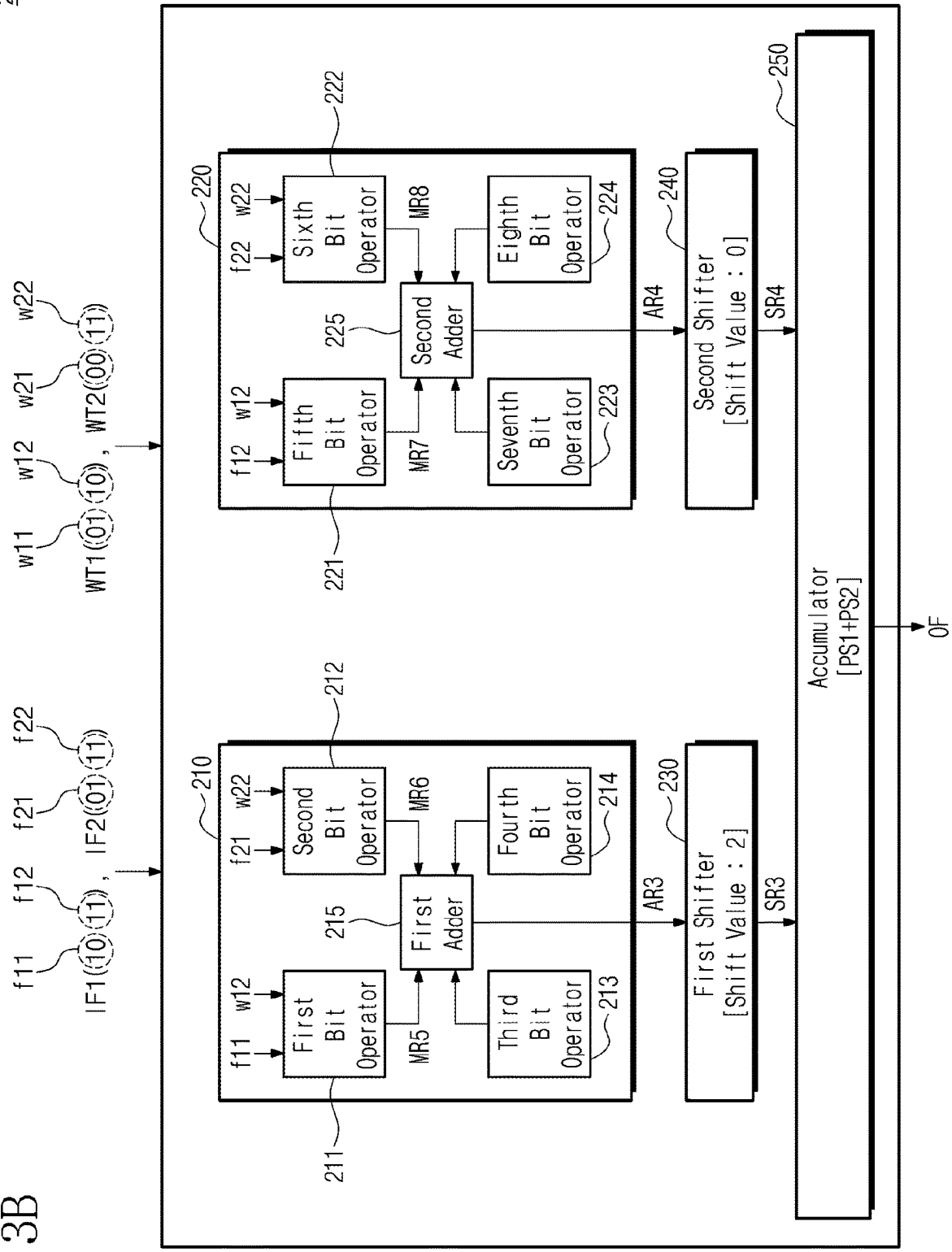

FIGS. 3A and 3B illustrate a single example in which the processing circuit of FIG. 2 generates output feature data based on input feature data and weight data. A processing circuit 200 may calculate the output feature data OF based on first and second input feature data IF1 and IF2 and first and second weight data WT1 and WT2. In particular, the processing circuit 200 may calculate the output feature data OF by adding a result of multiplying the first input feature data IF1 and the corresponding first weight data WT1 to a result of multiplying the second input feature data IF2 and the corresponding second weight data WT2. As illustrated in FIG. 3A, the processing circuit 200 may first calculate a first partial sum PS1 to calculate the output feature data OF. Next, as illustrated in FIG. 3B, the processing circuit 200 may calculate a second partial sum PS2. In this case, the first partial sum PS1 and the second partial sum PS2 may be intermediate data for calculating the desired output feature data OF. The processing circuit 200 may generate the output feature data OF by adding the first partial sum PS1 and the second partial sum PS2.

Hereinafter, after the calculation operation of the first partial sum PS1 is to be described with reference to FIG. 3A, the calculation operation of the second partial sum PS2 will be described with reference to FIG. 3B.

First of all, referring to FIG. 3A, the processing circuit 200 may receive the first and second input feature data IF1 and IF2 and the first and second weight data WT1 and WT2. For example, the first input feature data IF1 may be '1011'; the second input feature data IF2 may be '0111'. The first weight data WT1 may be '0110'; the second weight data WT2 may be '0011'.

The first and second input feature data IF1 and IF2 and the first and second weight data WT1 and WT2 may be divided by 2 bits depending on the number of operating bits of a bit operator. For example, the first input feature data IF1 may be divided into feature bits f11 and f12; the second input feature data IF2 may be divided into feature bits f21 and f22. The first weight data WT1 may be divided into weight bits w11 and w12; the second weight data WT2 may be divided into weight bits w21 and w22. In this case, the number of digits of the feature bits f11 and f21 may be higher than the number of digits of the feature bits f12 and f22; the number of digits of the weight bits w11 and w21 may be higher than the number of digits of the weight bits w12 and w22.

The divided bits may be provided to a sub-processing circuit 210 and 220 and a bit operator 221 to 214 and 221 to 224 in consideration of the number of digits of the divided bits. For example, to calculate the first partial sum PS1, the feature bits f11 and the weight bits w11 may be provided to the first bit operator 211 of the first sub-processing circuit 210. The feature bits f21 and the weight bits w21 may be provided to the second bit operator 212 of the first sub-processing circuit 210. In this case, the number of digits of the first multiplication result MR1 for the feature bits f11 and the weight bits w11 may be the same to the number of digits of the second multiplication result MR2 for the feature bits f21 and the weight bits w21, based on the output feature data OF. The feature bits f12 and the weight bits w11 may be provided to the fifth bit operator 221 of the second sub-processing circuit 220. The feature bits f22 and the weight bits w21 may be provided to the sixth bit operator 222 of the second sub-processing circuit 220. In this case, the number of digits of the third multiplication result MR3 for the feature bits f12 and the weight bits w11 may be the same to the number of digits of the fourth multiplication result MR4 for the feature bits f22 and the weight bits w21, based on the output feature data OF.

The bit operator 221 to 214 and 221 to 224 receiving the bits may perform a multiplication operation based on the received bits. For example, the first bit operator 211 may perform multiplication on the feature bits f11 and the weight bits w11 to calculate the first multiplication result MR1.

The adder 215 and 225 may generate an addition result by adding the provided multiplication results. For example, a first adder 215 may generate a first addition result AR1 by adding the first multiplication result MR1 and the second multiplication result MR2. The generated addition result may be provided to the corresponding shifter. For example, the first addition result AR1 may be provided to a corresponding first shifter 230.

The shifter 230 and 240 may shift the number of digits of the addition result depending on the shift value. For example, the first shifter 230 may shift the number of digits of the first addition result AR1 by 4 depending on the shift value being 4. In this case, the shift value '4' may be determined based on the number of digits of the feature bits f11 and f21 and the number of digits of the weight bits w11 and w21. A second shifter 240 may shift the number of digits of the second addition result AR2 by 2 depending on the shift value being 2. In this case, the shift value '2' may be determined based on the number of digits of the feature bits f12 and f22 and the number of digits of the weight bits w11 and w21. Accordingly, the first shifted addition result SR1 may be generated from the first shifter 230; the second shifted addition result SR2 may be generated from the second shifter 240.

An accumulator 250 may generate the first partial sum PS1 by adding the first shifted addition result SR1 and the second shifted addition result SR2.

Referring to FIG. 3B, to calculate the second partial sum PS2, the divided bits may be provided to a sub-processing circuit 210 and 220 and a bit operator 221 to 214 and 221 to 224 in consideration of the number of digits of the divided bits. For example, the feature bits f11 and the weight bits w12 may be provided to the first bit operator 211 of the first sub-processing circuit 210. The feature bits f21 and the weight bits w22 may be provided to the second bit operator 212 of the first sub-processing circuit 210. In this case, the number of digits of the fifth multiplication result MR5 for the feature bits f11 and the weight bits w12 may be the same to the number of digits of the sixth multiplication result MR6 for the feature bits f21 and the weight bits w22, based on the output feature data OF. The feature bits f12 and the weight bits w12 may be provided to the fifth bit operator 221 of the second sub-processing circuit 220. The feature bits f22 and the weight bits w22 may be provided to the sixth bit operator 222 of the second sub-processing circuit 220. In this case, the number of digits of the seventh multiplication result MR7 for the feature bits f12 and the weight bits w12 may be the same to the number of digits of the eighth multiplication result MR8 for the feature bits f22 and the weight bits w22, based on the output feature data OF.

The bit operator 221 to 214 and 221 to 224 receiving the bits may perform a multiplication operation based on the received bits. For example, the first bit operator 211 may perform multiplication on the feature bits f11 and the weight bits w12 to calculate the fifth multiplication result MR5.

The adder 215 and 225 may generate an addition result by adding the provided multiplication results. For example, the first adder 215 may generate a third addition result AR3 by adding the fifth multiplication result MR5 and the sixth multiplication result MR6. The generated addition result may be provided to the corresponding shifter.

The shifter 230 and 240 may shift the number of digits of the addition result depending on the shift value. For example, the first shifter 230 may shift the number of digits of the third addition result AR3 by 2 depending on the shift value being 2. In this case, the shift value '2' may be determined based on the number of digits of the feature bits f11 and f21 and the number of digits of the weight bits w12 and w22. The second shifter 240 may not shift the number of digits of the fourth addition result AR4 depending on the shift value being 0. In this case, the shift value '0' may be determined based on the number of digits of the feature bits f12 and f22 and the number of digits of the weight bits w12 and w22. Accordingly, the third shifted addition result SR3 may be generated from the first shifter 230; the fourth shifted addition result SR4 may be generated from the second shifter 240.

The accumulator 250 may generate the second partial sum PS2 by adding the third shifted addition result SR3 and the fourth shifted addition result SR4. The accumulator 250 may generate the output feature data OF by adding the first partial sum PS1 stored in advance and the second partial sum PS2.

Figure 4:
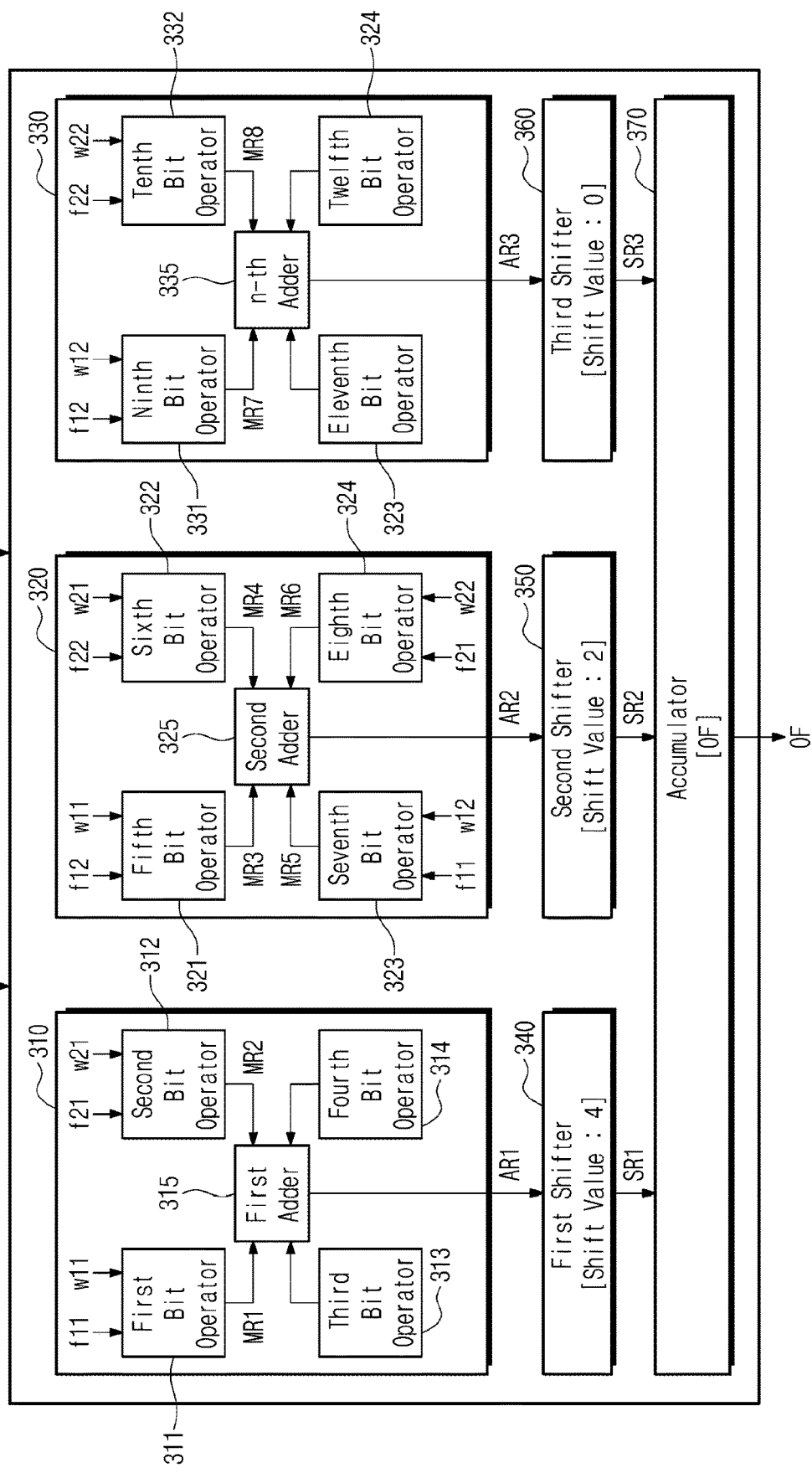
FIG. 4 illustrates another example in which the processing circuit of FIG. 2 generates output feature data based on input feature data and weight data.

FIG. 4 illustrates another example in which the processing circuit of FIG. 2 generates output feature data based on input feature data and weight data. Referring to FIG. 4, a processing circuit 300 may receive the first and second input feature data IF1 and IF2 and the first and second weight data WT1 and WT2. For example, the first input feature data IF1 may be '1011'; the second input feature data IF2 may be '0111'. The first weight data WT1 may be '0110'; the second weight data WT2 may be '0011'.

As described with reference to FIGS. 3A and 3B, the first and second input feature data IF1 and IF2 and the first and second weight data WT1 and WT2 may be divided by 2 bits depending on the number of operating bits of a bit operator.

The divided bits may be provided to a sub-processing circuit 310 to 330 and a bit operator 311 to 314, 321 to 324, and 331 to 334 in consideration of the number of digits of the divided bits. For example, the feature bits f11 and the weight bits w11 may be provided to a first bit operator 311 of a first sub-processing circuit 310. The feature bits f21 and the weight bits w21 may be provided to a second bit operator 312 of the first sub-processing circuit 310. In this case, the number of digits of the first multiplication result MR1 for the feature bits f11 and the weight bits w11 may be the same to the number of digits of the second multiplication result MR2 for the feature bits f21 and the weight bits w21, based on the output feature data OF. The feature bits f12 and the weight bits w11 may be provided to a fifth bit operator 321 of a second sub-processing circuit 320. The feature bits f22 and the weight bits w21 may be provided to a sixth bit operator 322 of the second sub-processing circuit 320. The feature bits f11 and the weight bits w12 may be provided to a seventh bit operator 323 of the second sub-processing circuit 320. The feature bits f21 and the weight bits w22 may be provided to an eighth bit operator 324 of the second sub-processing circuit 320. In this case, the number of digits of the third multiplication result MR3 for the feature bits f12 and the weight bits w11, the number of digits of the fourth multiplication result MR4 for the feature bits f22 and the weight bits w21, the number of digits of the fifth multiplication result MR5 for the feature bits f11 and the weight bits w12, and the number of digits of the sixth multiplication result MR6 for the feature bits f21 and the weight bits w22 may be the same to one another based on the output feature data OF. The feature bits f12 and the weight bits w12 may be provided to a ninth bit operator 331 of a third sub-processing circuit 330. The feature bits f22 and the weight bits w22 may be provided to a tenth bit operator 332 of the third sub-processing circuit 330. In this case, the number of digits of the seventh multiplication result MR7 for the feature bits f12 and the weight bits w12 may be the same to the number of digits of the eighth multiplication result MR8 for the feature bits f22 and the weight bits w22, based on the output feature data OF.

The bit operator 311 to 314, 321 to 324, and 331 to 334 receiving the bits may perform a multiplication operation based on the received bits. For example, the first bit operator 311 may perform multiplication on the feature bits f11 and the weight bits w11 to calculate the first multiplication result MR1.

The adder 315 to 335 may generate an addition result by adding the provided multiplication results. For example, a second adder 325 may generate a second addition result AR2 by adding third to sixth multiplication results MR3 to MR6. The generated addition result may be provided to the corresponding shifter.

The shifter 340 to 360 may shift the number of digits of the addition result depending on the shift value. For example, a first shifter 340 may shift the number of digits of the first addition result AR1 by 4 depending on the shift value being 4. In this case, the shift value '4' may be determined based on the number of digits of the feature bits f11 and f21 and the number of digits of the weight bits w11 and w21. A second shifter 350 may shift the number of digits of the second addition result AR2 by 2 depending on the shift value being 2. In this case, the shift value '2' may be determined based on the number of digits of the feature bits f11, f12, f21, and f22 and the number of digits of the weight bits w11, w12, w21, and w22. A third shifter 360 may shift the number of digits of the third addition result AR3 by 0 depending on the shift value being 0. In this case, the shift value 'O' may be determined based on the number of digits of the feature bits f12 and f22 and the number of digits of the weight bits w12 and w22. Accordingly, the first to third shifted addition results SR1 to SR3 may be generated from the first to third shifters 340 to 360.

An accumulator 370 may generate the output feature data OF by adding the first to third shifted addition results SR1 to SR3.

As described above, the processing circuit according to an embodiment of the inventive concept may perform an operation for calculating the output feature data OF in consideration of the number of digits of the feature bits of the input feature data IF and the number of digits of the weight bits of the weight data WT. In this case, because the numbers of digits of multiplication results calculated from bit operators of a single sub-processing circuit are the same as one another, multiplication results may be added without shifting the number of digits of the multiplication result produced from each of the bit operators. Accordingly, the processing circuit according to an embodiment of the inventive concept may include only a shifter corresponding to each of the sub-processing circuits without including a shifter corresponding to each of the bit operators. Accordingly, a hardware area of the neural network accelerator 1000 according to an embodiment of the inventive concept may be reduced. In addition, because the frequency of the shift operation is reduced, the computation amount of the neural network accelerator 1000 may be reduced.

Figure 5:
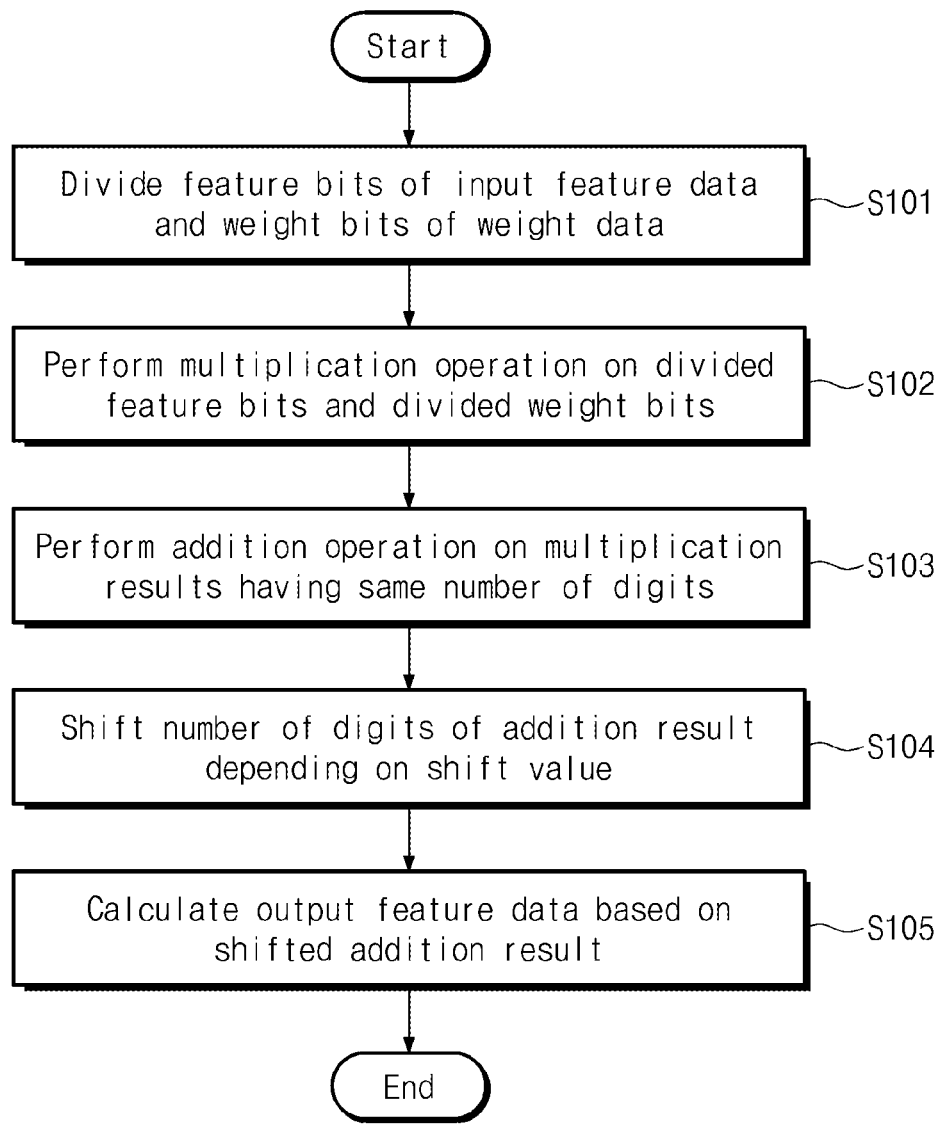
FIG. 5 is a flowchart illustrating an example of an operation of the processing circuit of FIG. 2.

FIG. 5 is a flowchart illustrating an example of an operation of the processing circuit of FIG. 2. Referring to FIGS. 2 and 5, in operation S101, the processing circuit 100 may divide the feature bits of input feature data IF and the weight bits of weight data WT. In particular, the processing circuit 100 may divide feature bits and weight bits depending on the number of operating bits of the bit operator.

In operation S102, the processing circuit 100 may perform multiplication operation on the divided feature bits and the divided weight bits. In this case, the number of digits of the multiplication result may be determined depending on the number of digits of the divided feature bits and the number of digits of the divided weight bits. In operation S103, the processing circuit 100 may perform addition operation on multiplication results having the same number of digits. In operation S104, the processing circuit 100 may shift the number of digits of the addition result depending on a shift value. In this case, the shift value may be determined depending on the number of digits of the divided feature bits and the number of digits of the divided weight bits. In operation S105, the processing circuit 100 may calculate output feature data based on the shifted addition result.

Figure 6A:
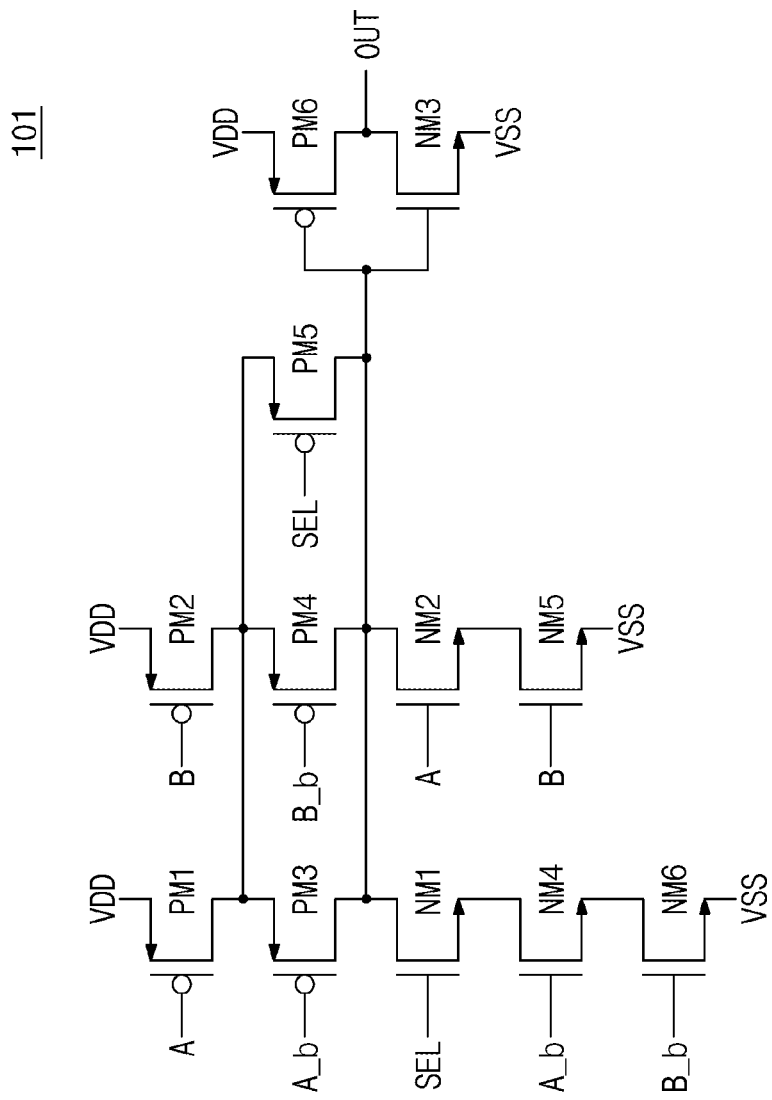
FIG. 6A illustrates an example of a circuit constituting the bit operator of FIG. 2.
Figure 6B:
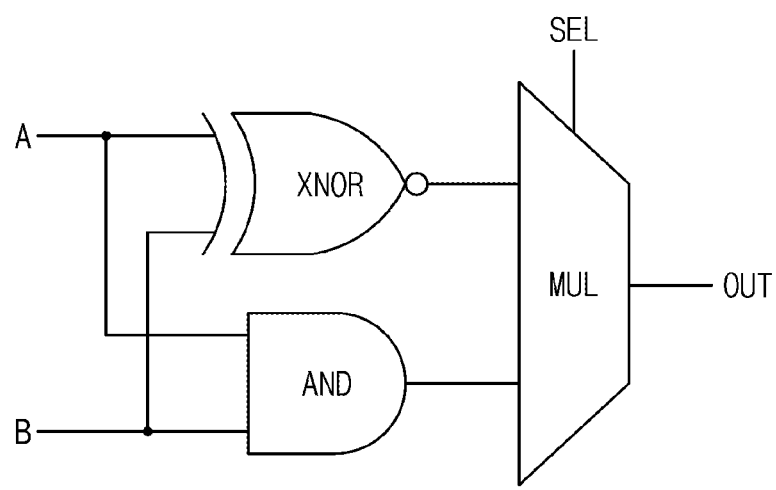
FIG. 6B illustrates an example of a circuit performing the same operation as the circuit of FIG. 6A.

FIG. 6A illustrates an example of a circuit constituting the bit operator of FIG. 2. FIG. 6B illustrates an example of a circuit performing the same operation as the circuit of FIG. 6A. In particular, as illustrated in FIG. 6B, the circuit of FIG. 6A may output one of the exclusive negative OR (XNOR) operation result for two input signals A and B or the AND operation result for two input signals A and B, as an output signal OUT based on a selection signal SEL.

Referring to FIG. 6A, the bit operator 101 may include first to sixth P-channel MOSFETs (PMOSs) PM1 to PM6 and first to sixth N-channel MOSFETs (NMOSs) NM1 to NM6. The power supply voltage VDD is applied to the first terminal of the first PMOS PM1; an input signal A is applied to the gate terminal of the first PMOS PM1. The power supply voltage VDD is applied to the first terminal of the second PMOS PM2; an input signal B is applied to the gate terminal of the second PMOS PM2. The first terminal of the third PMOS PM3 is connected to the second terminal of the first PMOS PM1; an inverted input signal A_b is applied to the gate terminal of the third PMOS PM3. The inverted input signal A_b is a signal obtained by inverting the input signal A. The first terminal of the fourth PMOS PM4 is connected to the second terminal of the second PMOS PM2; an inverted input signal B_b is applied to the gate terminal of the fourth PMOS PM4. The inverted input signal B_b is a signal obtained by inverting the input signal B. A select signal SEL is applied to the gate terminal of the fifth PMOS PMS. The first terminal of the third PMOS PM3, the first terminal of the fourth PMOS PM4, and the first terminal of the fifth PMOS PMS may be connected in common. The power supply voltage VDD is applied to the first terminal of the sixth PMOS PM6; the second terminal of the sixth PMOS PM6 is connected to the output terminal where the output signal OUT is output.

The first terminal of the first NMOS NM1 is connected to the second terminal of the third PMOS PM3; the select signal SEL is applied to the gate terminal of the first NMOS NM1. The first terminal of the second NMOS NM2 is connected to the second terminal of the fourth PMOS PM4; the input signal A is applied to the gate terminal of the second NMOS NM2. The first terminal of the third NMOS NM3 is connected to the second terminal and the output terminal of the sixth PMOS PM6; a ground voltage VSS is applied to the second terminal of the third NMOS NM3. The first terminal of the first NMOS NM1, the first terminal of the second NMOS NM2, the gate terminal of the third NMOS NM3, and the gate terminal of the sixth PMOS PM6 may be connected in common. The first terminal of the fourth NMOS NM4 is connected to the second terminal of the first NMOS NM1; the inverted input signal A_b is applied to the gate terminal of the fourth NMOS NM4. The first terminal of the fifth NMOS NMS is connected to the second terminal of the second NMOS NM2; the ground voltage VSS is applied to the second terminal of the fifth NMOS NM5. The input signal B is applied to the gate terminal of the fifth NMOS NM5. The first terminal of the sixth NMOS NM6 is connected to the second terminal of the fourth NMOS NM4, and the second terminal of the sixth NMOS NM6 is applied with the ground voltage VSS. The inverted input signal B_b is applied to the gate terminal of the sixth NMOS NM6.

According to the bit operator 101 of FIG. 6A, one of the XNOR operation result for two input signals A and B or the AND operation result for two input signals A and B may be output as an output signal OUT based on a selection signal SEL. That is, as illustrated in FIG. 6B, the circuit of FIG. 6A may perform a role the same as a multiplexer MUL that outputs one of the output of the XNOR gate or the output of the AND gate as the output signal OUT based on the XNOR gate receiving the two input signals A and B, the AND gate receiving the two input signals A and B, and the selection signal SEL.

As illustrated in FIG. 6A, when the bit operator 101 is implemented based on transistors, the number of transistors may be reduced in addition to performing the same function as the logic circuits of FIG. 6B. Accordingly, as well as the hardware area of the neural network accelerator 1000 including a plurality of bit operators, the power required for calculation of the neural network accelerator 1000 may be reduced.

As described above, the bit operator 101 according to an embodiment of the inventive concept may support both 1-bit XNOR operation and 1-bit AND operation. Accordingly, the bit operator 101 may perform multiplication based on the XNOR operation or may perform multiplication based on the AND operation. For example, when the input feature data IF of multi-bit and the weight data WT of multi-bit are converted to I-bit for precision reduction, the bit operator 101 may perform multiplication based on the XNOR operation. In this case, the amount of computation may be reduced in the neural network-based inference process, thereby reducing the consumed power.

The above description refers to embodiments for implementing the inventive concept. Embodiments in which a design is changed simply or which are easily changed may be included in the inventive concept as well as an embodiment described above. In addition, technologies that are easily changed and implemented by using the above embodiments may be included in the inventive concept. While the inventive concept has been described with reference to exemplary embodiments thereof, it will be apparent to those of ordinary skill in the art that vAR1ous changes and modifications may be made thereto without departing from the spirit and scope of the inventive concept as set forth in the following claims.

According to an embodiment of the inventive concept, a prec1s10n scalable neural network accelerator with the reduced hardware area may be provided.

Furthermore, according to an embodiment of the inventive concept, a prec1s10n scalable neural network accelerator capable of minimizing power consumption may be provided in a neural network calculation.

While the inventive concept has been described with reference to exemplary embodiments thereof, it will be apparent to those of ordinary skill in the art that vAR1ous changes and modifications may be made thereto without departing from the spirit and scope of the inventive concept as set forth in the following claims.

What is claimed is:

1. A neural network accelerator comprising:
   a first bit operator configured to generate first product bits of a multiplication of first feature bits of first input feature data and first weight bits of first weight data;
   a second bit operator configured to generate second product bits of a multiplication of first feature bits of second input feature data and first weight bits of second weight data;
   a third bit operator configured to generate third product bits of a multiplication of second feature bits of the first input feature data and first weight bits of the first weight data;
   a fourth bit operator configured to generate fourth product bits of a multiplication of second feature bits of the second input feature data and the first weight bits of the second weight data;
   a first adder configured to generate first sum bits, including a summation of the first product bits and the second product bits;
   a second adder configured to generate second sum bits, including a summation of the third product bits and the fourth product bits;
   a first shifter configured to generate a first bit-shifted value by first bit-shifting the first sum bits by a first bit shift extent; and
   a second shifter configured to generate a second bit-shifted value by second bit-shifting the second sum bits by a second bit shift extent,
   wherein the first bit shift extent is dependent on a first bit position difference between a least significant bit of the first feature bits, in the first input feature data, and a least significant bit of the first input feature data, and the first bit shift extent is dependent on a second bit position difference between a least significant bit of the first weight bits, in the first weight data, and a least significant bit of the first weight data, and
   wherein the second bit shift extent is different from the first bit shift extent.

2. The neural network accelerator of claim 1, wherein the first bit position difference is X, the second bit position difference is Y, and the first bit shift extent is X+Y bits.

3. The neural network accelerator of claim 2, wherein X and Y are non-zero and same.

4. The neural network accelerator of claim 2, wherein Y is greater than X.

5. The neural network accelerator of claim 2, wherein X is greater than Y.

6. The neural network accelerator of claim 1, wherein the second bit shift extent is dependent on a third bit position difference between a least significant bit of the second feature bits, in the first input feature data, and a least significant bit of the first input feature data, and the second bit shift extent is dependent on the second bit position difference.

7. The neural network accelerator of claim 6, wherein the third bit position difference is P, and the second bit shift extent is Y+P bits.

8. The neural network accelerator of claim 7, wherein Y and P are non-zero and same.

9. The neural network accelerator of claim 7, wherein Y is greater than P.

10. The neural network accelerator of claim 7, wherein P is greater than Y.

11. The neural network accelerator of claim 1, wherein the first input feature data is divided, corresponding to a total number of operating bits of the first bit operator, into the first feature bits of the first input feature data and second feature bits of the first input feature data, and
    wherein the second input feature data is divided, corresponding to a total number of operating bits of the second bit operator, into the first feature bits of the second input feature data and the second feature bits of the second input feature data.

12. The neural network accelerator of claim 1, further comprising:
    an accumulator configured to generate output feature data based on the first bit-shifted value and the second bit-shifted value.

13. A neural network accelerator comprising:
    a first bit operator configured to generate first product bits of a multiplication of first feature bits of first input feature data and first weight bits of first weight data;
    a second bit operator configured to generate second product bits of a multiplication of first feature bits of second input feature data and first weight bits of second weight data;

a third bit operator configured to generate third product bits of a multiplication of the first feature bits of the first input feature data and second weight bits of the first weight data;

a fourth bit operator configured to generate fourth product bits of a multiplication of the first feature bits of the second input feature data and second weight bits of the second weight data;

a first adder configured to generate first sum bits, including a summation of the first product bits and the second product bits;

a second adder configured to generate second sum bits, including a summation of the third product bits and the fourth product bits;

a first shifter configured to generate a first bit-shifted value by first bit-shifting the first sum bits by a first bit shift extent; and a second shifter configured to generate a second bit-shifted value by second bit-shifting the second sum bits by a second bit shift extent;

wherein the first bit shift extent is dependent on a first bit position difference between a least significant bit of the first feature bits, in the first input feature data, and a least significant bit of the first input feature data, and the first bit shift extent is dependent on a second bit position difference between a least significant bit of the first weight bits, in the first weight data, and a least significant bit of the first weight data, wherein the second bit shift extent is different from the first bit shift extent.

14. The neural network accelerator of claim 13, wherein the second bit shift extent is dependent on the first bit position difference, and the second bit shift extent is dependent on a fourth bit position difference between a least significant bit of the second weight bits, in the first weight data, and a least significant bit of the first weight data.

15. The neural network accelerator of claim 14, wherein the first bit position difference is X, the second bit position difference is Y, and the first bit shift extent is X+Y bits.

16. The neural network accelerator of claim 15, wherein the fourth bit position difference is Q, and the second bit shift extent is X+Q bits.

17. The neural network accelerator of claim 15, wherein X is greater than Q.

18. The neural network accelerator of claim 15, wherein Q is greater than X.

19. The neural network accelerator of claim 13, further comprising:

an accumulator configured to generate output feature data based on the first bit-shifted value and the second bit-shifted value.

* * * * *